(No Model.)

J. KELLEY.
CHAIN CONVEYER.

No. 273,741. Patented Mar. 13, 1883.

Witnesses:
P. R. Richards
Harry M. Richards

Inventor:
John Kelley,
By W. B. Richards,
Atty.

UNITED STATES PATENT OFFICE.

JOHN KELLEY, OF MOLINE, ILLINOIS, ASSIGNOR OF TWO-THIRDS TO HENRY H. HILL AND STEPHEN T. WALKER, BOTH OF SAME PLACE.

CHAIN CONVEYER.

SPECIFICATION forming part of Letters Patent No. 273,741, dated March 13, 1883.

Application filed August 31, 1882. (No model.)

*To all whom it may concern:*

Be it known that I, JOHN KELLEY, a citizen of the United States, residing at Moline, in the county of Rock Island and State of Illinois, have invented certain new and useful Improvements in Chain Conveyers; and I do hereby declare the following to be a full, clear, and exact description of the invention, such as will enable others skilled in the art to which it appertains to make and use the same.

Figure 1:
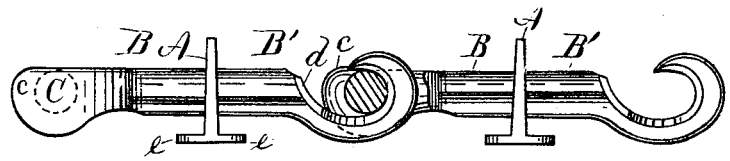
Figure 2:
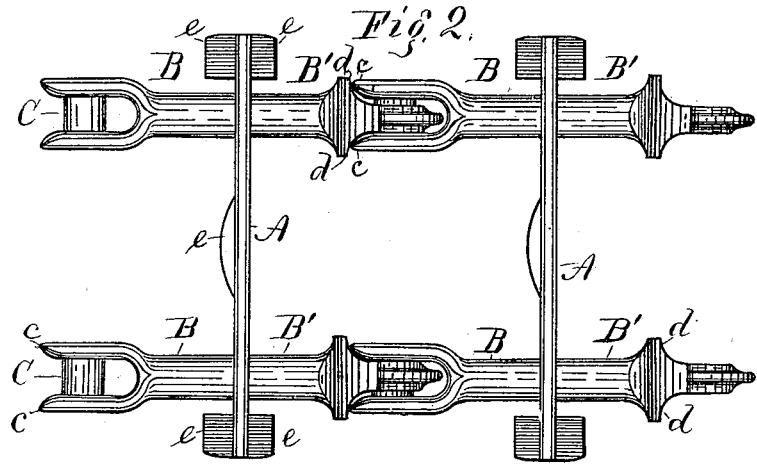
Figure 3:
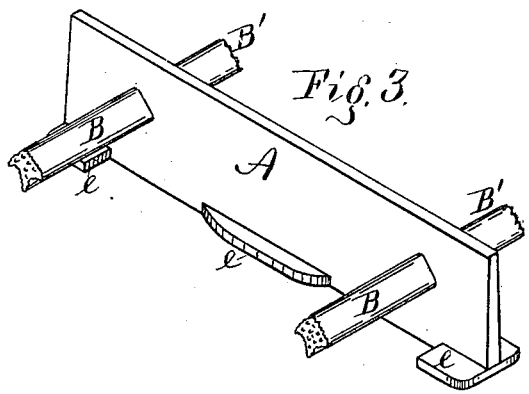
Figure 4:
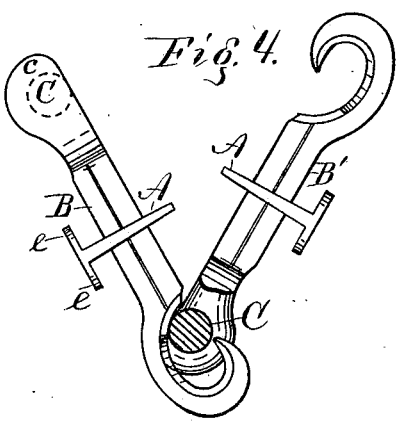

In the annexed drawings, which illustrate my invention, Figure 1 is a side elevation, partly in section, in the line $x\,x$ of Fig. 2. Fig. 2 is a top plan of two links coupled together. Fig. 3 is a perspective showing a push-plate and parts of the link. Fig. 4 is a side elevation, partly in section, as at Fig. 1, of two links, shown in relative positions for coupling or uncoupling.

This invention relates to chain conveyers of that class used in grain-elevators, saw-mills, and other places for pushing or dragging sawdust or other material through spouts or troughs; and the invention consists in a link for such chains, formed of a push-plate, from which a bar or bars extend to form the longitudinal parts of the link, and which bar or bars have no connection to each other except by the push-plates, and, as a secondary feature of the invention, are adapted to be hinged to the bar or bars of adjacent links by any of the ordinary hinges, which only permit of separating the links when they are brought into certain positions relatively to each other.

Referring to the drawings by letters, the same letter indicating the same part in the different figures, A represents the push-plate or flight, which may be of any desired practical form, but which I prefer of a rectangular form, as shown in the drawings.

B B are bars projecting from one side of the push-plate, and B' B' are bars projecting from its opposite side. The bars B and B', I prefer formed integral with the push-plates; but they may be formed separate and be secured to each other, as desired. They (the bars B B') are preferably located a short distance from the end of the push-plate, so that the projecting end of the push-plate may fit snugly to the trough through which it moves in operation; and these bars may be located mid-width of the push-plates, as shown, when it is desired to produce a chain with push-plates adapted to act on either of their sides; or the bars may be attached near or at one side of the push-plates when it is desired to produce a chain which shall only act on one of its sides in the bottom of the trough. The bars B B' and push-plate A form a link without other bars or connecting devices of any kind between the side bars of said link. The outer ends of the bars B are bifurcated or forked, as shown, and each has a journal-bar, C, in its forked end and at a short distance from its outer ends, so as to leave projecting shoulders $c$. The outer ends of the bars B' are hook-shaped, as shown, and in rear of each hook has laterally-projecting flanges $d$. The links may be coupled or connected together or uncoupled by turning them into the relative positions shown at Fig. 4, but when coupled and in working positions, as shown at Figs. 1 and 2, the shoulders $c$ will come in contact with the flanges $d$ and prevent uncoupling. The special method of coupling the links need not be described more fully here, as it is shown fully in Letters Patent No. 237,967; and I do not claim it, *per se*, in this application.

The plates A may have projecting flanges $e$ on one of their wearing-edges, as shown, or on both edges, when required to protect them, to aid in sustaining them in upright positions and to increase their wearing capabilities. The push-plate A may be located nearer one end of the link than the other by making the bars B of different lengths from the bars B'; but I prefer making the bars B and B' of same or nearly same lengths, as it produces a chain with many advantages by having the push-plate located about centrally between its points of articulation.

Chains embodying substantially the main features of my invention may be made with only one bar B and one bar B' to each link by projecting said bars from the central part of the push-plate, or by using more than two bars B and two B'; and hence I do not limit my claim to a link with the exact number of bars B and B' which I have shown; but

What I claim, and desire to secure by Letters Patent, is—

1. In a conveyer-chain, a link formed of a push-plate or flight with projecting bars, which form the sides of the link, and have no connecting end bars or other transverse connecting-bars, substantially as described.

2. In a conveyer-chain, a link formed of side bars connected by a push-plate and having no other connection, substantially as described.

3. In a conveyer-chain, a link formed of side bars and a push-plate integral therewith, and located about mid-length between the points of articulation of the link, substantially as and for the purpose specified.

4. In a conveyer-chain, a link formed of a push-plate having side bars projecting from one of its sides, provided with hooks on their outer ends, and side bars projecting from its other side, having eyes, whereby adjacent links may be coupled to each other by engaging the hook-bars of one link with the eyes of another, and in which the side bars have no other connection to each other except by the push-plate, substantially as and for the purpose specified.

5. In a conveyer-chain, a link formed of push-plate A and arms B B', substantially as and for the purpose specified.

In testimony whereof I affix my signature in presence of two witnesses.

JOHN KELLEY.

Witnesses:
SAML. N. GROSE,
HARRY M. RICHARDS.